(12) United States Patent
Plamondon et al.

(10) Patent No.: US 8,137,446 B2
(45) Date of Patent: Mar. 20, 2012

(54) PARTICLE CONCENTRATOR

(75) Inventors: Thomas D. Plamondon, Haverhill, MA (US); Nikolay Rolshud, Winchester, MA (US); Peter F. Cram, Merrimack, NH (US); Mark Fraser, Nashua, NH (US)

(73) Assignee: L-3 Communications Security and Detection Systems, Inc., Woburn, MA (US)

( * ) Notice: Subject to any disclaimer, the term of this patent is extended or adjusted under 35 U.S.C. 154(b) by 1034 days.

(21) Appl. No.: 12/047,052

(22) Filed: Mar. 12, 2008

(65) Prior Publication Data
US 2009/0007786 A1 Jan. 8, 2009

Related U.S. Application Data

(60) Provisional application No. 60/894,617, filed on Mar. 13, 2007.

(51) Int. Cl.
*B01D 45/00* (2006.01)
*B01D 45/02* (2006.01)

(52) U.S. Cl. ........... 96/413; 73/863.22; 55/397; 55/398; 55/442; 55/446

(58) Field of Classification Search .............. 95/267; 55/308, 315, 319, 331, 396, 423, 462, 482, 55/521, DIG. 37, 442–446
See application file for complete search history.

(56) References Cited

U.S. PATENT DOCUMENTS

| 2,001,259 | A | * | 5/1935 | Lucke | 95/211 |
|---|---|---|---|---|---|
| 2,034,467 | A | | 3/1936 | Eugen | |
| 2,122,511 | A | | 4/1938 | Bubar | |
| 2,203,592 | A | * | 6/1940 | Brundage | 261/112.1 |
| 2,415,935 | A | * | 2/1947 | Bullock | 55/347 |
| 3,220,168 | A | * | 11/1965 | Van Der Meer | 55/422 |
| 3,368,330 | A | * | 2/1968 | Elliott et al. | 96/198 |
| 3,375,058 | A | | 3/1968 | Petersen | |
| 3,725,271 | A | | 4/1973 | Giannotti | |
| 4,340,474 | A | | 7/1982 | Johnston | |
| 4,640,140 | A | * | 2/1987 | Burghoffer et al. | 73/863.22 |

(Continued)

FOREIGN PATENT DOCUMENTS

DE         600 289 C        7/1934

(Continued)

OTHER PUBLICATIONS

Tempest S-Series Cyclone Dust Collection Systems, Owner's Manual TEMP1425S, TEMP1535S, TEMP1550S, PSI Woodworking, 2005.

(Continued)

*Primary Examiner* — Duane Smith
*Assistant Examiner* — Sonji Turner
(74) *Attorney, Agent, or Firm* — Fish & Richardson P.C.

(57) ABSTRACT

Concentrating particles in a turbulent gas flow may include receiving, in a receptacle, a turbulent gas flow that includes particles. The concentration of particles in a gas flow exiting the receptacle at a first port is increased as compared with a concentration of the particles in the gas flow received by the receptacle. The increased concentration of particles is accomplished by removing a portion of the gas flow by using a second port, and fluidly communicating the gas flow through a tube in the receptacle. The tube has a smaller diameter at the end of the tube at which the gas flow exits the tube than diameter at the end of the tube at which the gas flow is received.

30 Claims, 11 Drawing Sheets

U.S. PATENT DOCUMENTS

| | | | |
|---|---|---|---|
| 4,645,521 A | | 2/1987 | Freesh |
| 5,221,305 A | * | 6/1993 | Bakharev ................... 55/442 |
| RE35,300 E | * | 7/1996 | Bakharev ................... 55/442 |
| 5,760,314 A | | 6/1998 | Bromberg |
| 6,056,798 A | | 5/2000 | Cox |
| 6,453,758 B1 | | 9/2002 | Marple |
| 6,990,846 B2 | * | 1/2006 | Sioutas ................... 73/28.05 |
| 7,232,477 B2 | | 6/2007 | Rodgers |
| 7,261,007 B2 | | 8/2007 | Haglund et al. |

FOREIGN PATENT DOCUMENTS

| | | |
|---|---|---|
| GB | 388627 | 3/1933 |
| WO | WO9311852 A1 | 6/1993 |

OTHER PUBLICATIONS

FD Cyclones High Efficiency Centrifugal. Particulate Separators, FARR Air Pollution Control, 2005.

International Search Report and the Written Opinion of the International Searching Authority, issued for PCT/US2008/056635, on Jul. 15, 2008.

Supplementary European Search Report for European Application No. EP 08 73 1983, mailed Mar. 2, 2011, 3 pages.

* cited by examiner

PARTICLE CONCENTRATOR

CROSS REFERENCE TO RELATED APPLICATIONS

This application claims the benefit of U.S. Provisional Application No. 60/894,617, filed Mar. 13, 2007 nd titled TRIPLE CONE PARTICLE CONCENTRATOR FOR EXPLOSIVE DETECTION, which is incorporated by reference in its entirety.

TECHNICAL FIELD

This description relates to concentrating particles for analysis.

BACKGROUND

Trace sampling of particles may be used to identify particular types or classes of particles. For example, luggage, cargo containers and people may be screened for explosives or contaminants. More particularly; a sample of trace (e.g., microscopic) particles may be collected from an item or individual, and analyzed for properties indicative of explosives or threats. The analysis of particles may be conducted using a variety of techniques, such as mass spectrometry, ion mobility detection, and gas chromatography with chemiluminescence. Some techniques are able to detect only specific types of particles, or specific classes of particles (e.g., particles with specific types of chemical structures).

SUMMARY

In one general aspect, an apparatus for collecting particles from a gas flow includes a housing, which has includes an input tube, a first cone-shaped tube, a second cone-shaped tube, an outlet tube, a sample output port and a bypass output port. The input tube is configured to receive a non-condensable gas flow, where the gas flow includes particles of matter. The first cone-shaped tube has a first inlet and a first outlet. The first inlet is configured to receive the gas flow from the input tube. The diameter of the first outlet is larger than the diameter of the first inlet. The first cone-shaped tube is configured to fluidly communicate the gas flow to the first outlet. The second cone-shaped tube has a second inlet and a second outlet. The second inlet is configured to receive the gas flow from the first cone-shaped tube. The diameter of the second outlet is larger than the diameter of the second inlet. The second cone-shaped tube is configured to fluidly communicate the gas flow to the second outlet. The outlet tube has a third inlet and a third outlet. The third inlet is configured to receive the gas flow from the second cone-shaped tube. The sample output port is configured to receive a first portion of the gas flow only after the gas flow has passed through the outlet tube. The bypass output port is configured to receive a second portion of the gas flow after the gas flow has passed through the first cone-shaped tube and before the gas flow has passed through the second cone-shaped tube such that the portion of the second portion of the gas flow is removed from the housing. The second cone-shaped tube is separated from the first cone-shaped tube by a space enabling gas to be fluidly communicated from the first cone-shaped tube to the bypass output port.

In another general aspect, an apparatus for collecting particles from a gas flow includes a receptacle having a condenser tube and an outlet tube. The condenser tube has a first inlet and a first outlet. The condenser tube is configured to receive a non-condensable, turbulent gas flow, where the gas flow includes particles of matter. The diameter of the first inlet of the condenser tube is greater than diameter of the first outlet of the condenser tube. The condenser tube is configured to fluidly communicate the gas flow to the first outlet. The outlet tube has a second inlet and a second outlet and is separate from the condenser tube by a space. The space enables a first portion of the gas flow to exit the receptacle through a bypass output port.

Implementations may include one or more of the following features. For example, the gas flow may include a gas flow of at least two liters per second. The condenser tube may be referred to as a first condenser tube. The receptacle may include a second condenser tube having a third inlet and a third outlet. The first condenser tube may be configured to receive the gas flow only after the gas flow has passed through the second condenser tube. The diameter of the third inlet of the second condenser tube may be greater than diameter of the third outlet of the condenser tube. The second condenser tube may be configured to fluidly communicate the gas flow to the first outlet. The second condenser tube may be separate from the first condenser tube by a second space, where the second space enables a second portion of the gas flow to exit the receptacle through the bypass output port. A sample output port may be configured to receive a third portion of the gas flow only after the gas flow has passed through the outlet tube.

An input tube may be connected to the second condenser tube and configured to receive the gas flow before the gas flow is received by the second condenser tube. A straight tube may have substantially same diameter at each end of the tube. The straight tube may be connected to the first condenser tube and configured to receive the gas flow only after the gas flow has passed through the second condenser tube and before the gas flow is received by the first condenser tube.

The apparatus may include a particle collector configured to receive the gas flow only after the gas flow has passed through the outlet tube and to hold particles from the gas flow. The particle collector may be a low-porosity mesh or fiber. One or more gas flow sources may be connected to the sample output port and the bypass output port such that the gas flow is pulled from the input tube to the sample output port and the bypass output port.

Vacuum pressure of the second portion of the gas flow at the bypass output port may be equal to or greater than vacuum pressure of the third portion of the gas flow at the sample output port. Volume of the second portion of the gas flow at the bypass output port may be greater than volume of the third portion of the gas flow at the sample output port.

The second portion of the gas flow at the bypass output port may include fewer particles of matter than the third portion of the gas flow at the sample output port. The third portion of the gas flow at the sample output port may include more particles of matter than the gas flow received by the second condenser tube. The space may include multiple holes in a ring to enable the first portion of the gas flow to exit the receptacle through the bypass output port. The ring may be configured with two rows of holes to enable gas to be fluidly communicated from the first cone-shaped tube to the bypass output port. The gas flow may include one or more of air, natural gas, propane, or a Freon gas. The receptacle may include multiple input tubes where an input tube configured to receive the gas flow.

In yet another general aspect, concentrating particles in a turbulent gas flow may include receiving, in a receptacle, a turbulent gas flow that includes particles. The concentration of particles in a gas flow exiting the receptacle at a first port is increased as compared with a concentration of the particles in the gas flow received by the receptacle. The increased concentration of particles is accomplished by removing a portion of the gas flow by using a second port, and fluidly communicating the gas flow through a tube in the receptacle. The tube has a smaller diameter at the end of the tube at which the gas flow exits the tube than diameter at the end of the tube at which the gas flow is received.

Implementations of the techniques discussed above may include a method, a process, a system or an apparatus. The details of one or more of the implementations are set forth in the accompanying drawings and description below. Other features will be apparent from the description and drawings, and from the claims.

DESCRIPTION OF DRAWINGS

FIGS. 1-8B are block diagrams of particle concentrators.

DETAILED DESCRIPTION

Trace particle sampling of luggage, cargo, and people involves multiple steps including: extraction of the particle from the substrate or material, aspiration of the particles into an inlet or port, transport of the particles to a collection region or zone, collection of the particles onto a mesh or other media, and analysis of the particles. Because the overall sampling efficiency is generally a serial product of each step, techniques to improve any stage, such as particle collection, are beneficial.

Techniques are described for enhancing particle collection, particularly for trace sampling applications seeking to enhance collection of particles having physical diameter greater than 10 microns from high volume flow rates (greater than two liters per second) under turbulent flow conditions (i.e. Reynolds numbers greater than 4000) onto low porosity media, such as a mesh or fiber. The described techniques are compatible with single or multiple input sources and are resilient to changes in total flow rate.

Techniques may be applied for collection (and later analysis and detection) of specific types of particles, including explosives, contaminants, controlled substances, biological agents, chemical agents, and/or another type of substance of interest. In general, a particle concentrator concentrates a particle sample for presentation to an analyzer or an analytical mechanism or process for inspection. A particle concentration mechanism or process may be used in a system for detecting traces of explosives on a physical item. When a person is to be sampled, or a physical item to be sampled is of a substantial size, such as a cargo container, contents of a commercial truck, a parcel or a suitcase, a particle concentration process may be used to collect particles within a large volume of air. In general, a particle concentration process uses an air bypass to reduce the amount of air to an amount that is able to be analyzed, while minimizing the removal of particles in the air sample. As a result of the concentration, the volume of air sample to be analyzed includes a ratio of particles to the volume of air sample that is higher than the ratio of the particles to the volume of air sample in the original volume of air extracted from around the item, area or person to be sampled.

More particularly, to perform trace sampling for a particular class of substance, such as, for example, explosives, large quantities of air are drawn into a collection apparatus such as a filter. The particles entrained in the air stream are gathered together on the filter and presented to an analytical mechanism. Due to the large flow rate of air relative to the low porosity of the filter, most of the air must be discarded. For example, in many cases, the large volume of air that is collected cannot physically pass through the size filter required to detect the particular class of substance. In the context of explosive detection, there may be many micron-sized particles in the air sample are to be analyzed and a filter having small pore sizes may be employed in the detection system and process. When a relatively large physical item, such as a cargo container, a person, a suitcase or a parcel, is to be sampled for trace explosives, a large volume of air is collected. It generally is necessary to remove excess air to reduce, and, in some cases, greatly reduce, the volume of air.

A particle concentrator may be employed in a system for screening air cargo, checked baggage or in a hand-carry baggage system, for example. The system that includes a particle concentrator for trace explosive, detection may be used in addition to, or in lieu of, another type of security and detection system, such as a system that use x-rays to identify a threat.

FIGS. 1-8B illustrate particle concentrators that are able to reduce the volume of air flow that is used to perform trace sampling for explosive detection. A particle concentrator is used to remove large quantities of air from a sample that includes micron-sized and larger particles of interest. A particle concentrator is able to diffuse and bypass the excess and unwanted air and then is able present a concentrated particle sample to an analytical mechanism for inspection.

In general, as air flows through multiple stages of tubes in a particle concentrator where each tube stage reduces the area to compress the air flow and a gap exists between stages. Each tube stage creates a nozzle effect on the air flow such that when the air flow enters a gap after exiting the tube stage, a zone of low pressure affects the air flow. Since, in general, gas molecules react faster than particle molecules to the low pressure, gas molecules (rather than particle molecules) generally exit the gas flow. Particles within the air flow continue to the next stage. The number of stages and reduction in each stage may vary based on the size of particles to be collected and the velocity of the air flow output from the particle concentrator, used from the output port. Also, in general, using more stages helps to increase the efficiency of the particle concentrator such that a higher percentage of small particles are collected at the output port (as compared with using fewer numbers of stages).

Figure 1:
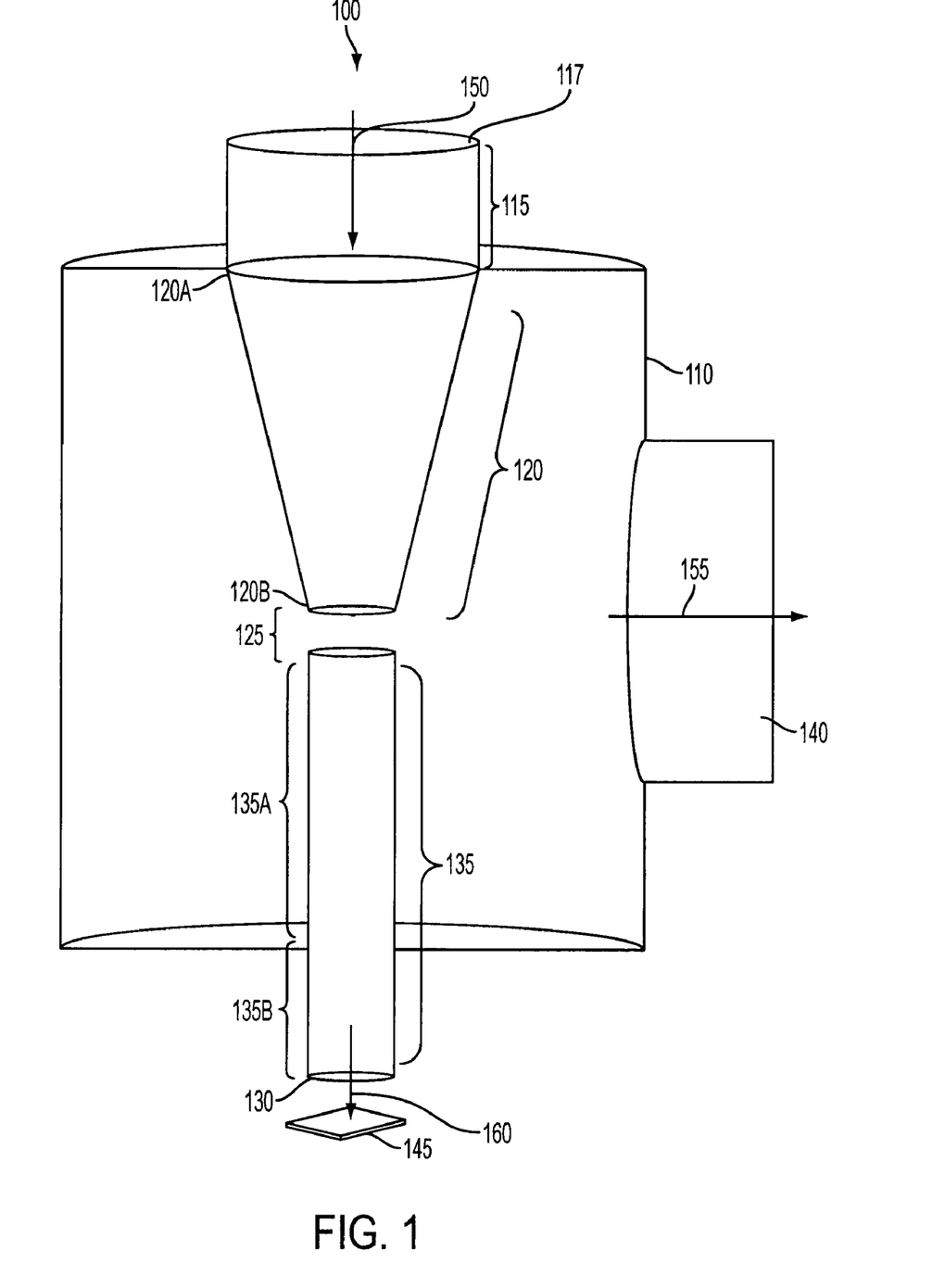

More particularly, FIG. 1 depicts an example particle concentrator 100 that may be used to receive a flow of air having particles and collect particles from the air flow on collection material. The collected particles may be analyzed to identify one or more substances of interest, such as explosives, contaminants, controlled substances, biological agents and chemical agents.

The particle concentrator 100 includes a concentrator housing 110 and an input tube 115, which is configured to receive an air flow. A concentrator housing also may be referred to as a receptacle. One end of the input tube 115 may be referred to as an input port 117. The input tube 115 is external to the concentrator housing 110 and is connected to a cone section 120, which is inside the concentrator housing 110. The cone section 120 tapers such that the diameter of the end 120A of the cone section 120 is larger than the diameter of the other end 120B of the cone section 120.

The particle concentrator 100 also includes an output tube 135, which is configured to receive the air flow being fluidly communicated through the input tube 115 and the cone sec- 
tion 120. The output tube 135 passes through a side of the concentrator housing 110 such that a portion 135A is inside the concentrator housing 110 and a portion 135B is external to the concentrator housing 110. The external end 130 of the output tube 135 serves as a sample output port 130. The air flow being fluidly communicated through the output tube 135 flows out the sample output port 130 and onto collection material 145. In this example, the collection material 145 is a low-porosity screen mesh or fiber that allows the air flow to pass through the screen while the particles in the air flow collect on the screen.

Figure 2:
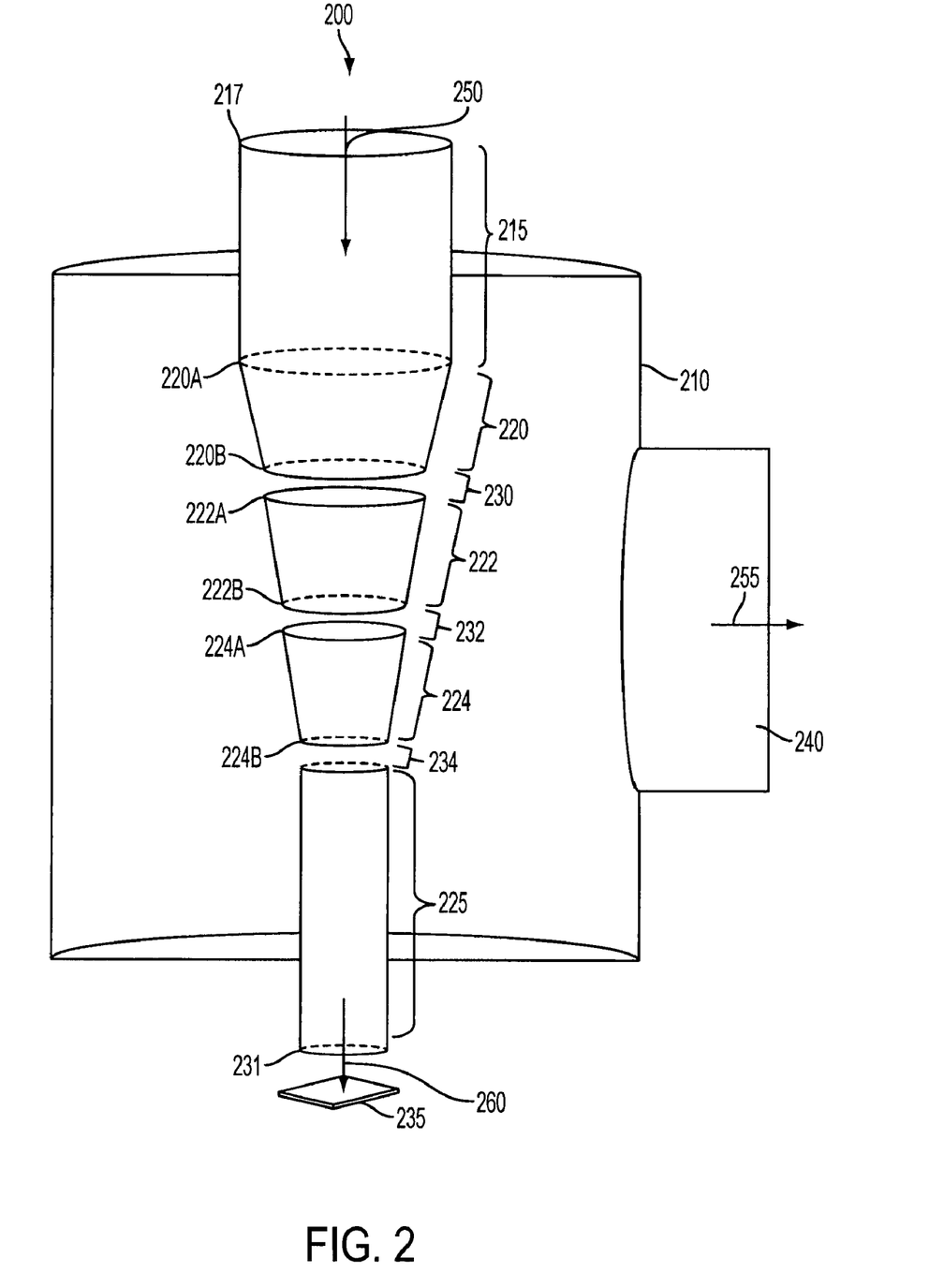

The particle concentrator 100 also includes a bypass output port 140, from which a portion of the air flow exits the concentrator housing 110. A space 125 (here called a bypass gap 125) exists between the cone section 120 and the output tube 135. The bypass gap 125 allows a portion of the air flow being fluidly communicated through the input tube 115 and the cone section 120 to exit the concentrator housing 110 through the bypass output port 140.

In operation, a vacuum pump(s) is used to fluidly communicate an air flow from the input tube 115 to the sample output port 130 and the bypass output port 140. One portion 160 of the input air flow 150 is fluidly communicated to the output tube 135 and the sample output port 130, whereas another portion 155 of the input air flow 150 is fluidly communicated to the bypass output port 140. The velocity of the air flow through the concentrator is such that the particles are kept toward the center of the air flow (e.g., near the centerline of the air flow) so that fewer particles fall out of the air flow, such as by clinging to the tube walls or expanding outside of the air flow in the interior of the concentrator housing. The sample output port 130 has lower-vacuum pressure and a lower air flow volume inflow 160 as compared with the vacuum pressure of the bypass output port 140 and air flow volume of flow 155. For example, the bypass output port may have two hundred fifty inches of vacuum pressure, whereas the sample output port may have forty inches of vacuum pressure. The inertial force of the particles from the higher pressure at the sample output port 130 helps to keep the particles in the center air flow, as does the tapering shape of the cone section 120. The bypass gap 125 allows a portion 155 of the air flow (and here, a large portion of the air flow) exit the concentrator at the bypass output port 140, leaving the particles in the lower volume of air flowing through the output tube 135. For example, in some implementations, the air flow 155 exiting the bypass output port 140 may be around eighty percent of the input air flow 150. The removal of a portion 155 of the air flow through the bypass output port 140 concentrates the particles such that the ratio of particles to the volume of air in air flow 160 is higher than the ratio of the particles to the volume of air in the original volume of air in the input air flow 150.

In some implementations, the input air flow 150 may be a high velocity air flow (such as an air flow having the rate of two or more liters per second) or may be a turbulent air flow (such as an air flow having eddies of air current, in contrast with a laminar or stagnant air flow).

In some implementations, the input air flow 150 may be pushed into the concentrator 100 in addition to, or in lieu of, being pulled through the sample output port 130 and the bypass output port 140. The input air flow 150, for example, may be generated by vacuuming an object, such as clothing, luggage, or an individual's skin, that is to be tested or pushing an air flow obtained from a surface or a chamber to be tested.

FIG. 2 depicts another example particle concentrator 200 that may be used to receive a flow of air having particles and collect particles from the air flow on collection material. The particle concentrator 200 includes a concentrator housing 210, an input tube 215, which is configured to receive an air flow, and an input port 217. In contrast with the concentrator 100 described previously with respect to FIG. 1, the concentrator 200 includes three cone sections 220, 222 and 224. The first cone section 220 is connected to the input tube 215. A bypass gap 230 exists between the first cone section 220 and the second cone section 222; a bypass gap 232 exists between the second cone section 222 and the third cone section 224; and a bypass gap 234 exists between the third cone section 224 and the output tube 225.

The diameter of each of the cones 220, 222 and 224 tapers. Specifically, the diameter of the end 220A of the first cone section 220 is larger than the diameter of the end 220B of the first cone section 220. Also, the diameter of the end 222A of the second cone section 222 is larger than the diameter of the end 222B of the second cone section 222. Further, the diameter of the end 224A of the third cone section 224 is larger than the diameter of the end 224B of the third cone section 224.

The diameter of each of the cones 220, 222 and 224 also taper with respect to the diameters of the other cones. More specifically, the diameter of the end 220B of the first cone section 220 is the same or slightly less than the diameter of the end 222A of the second cone. The diameter of the end 222B of the second cone section 222 is the same or slightly less than the diameter of the end 224A of the third cone. Having the receiving end of a subsequent cone slightly larger than the output end of a previous cone may help to keep more particles on centerline of the flow. For example, particles at the edge of air flow as the air flow passes out of the first cone section 220 at end 220B may have a tendency to spread outside the air flow during the bypass gap 230 and not be received by the end 222A. By using an end 222A of the second cone section 222 that is slightly larger than the end 220B of the first cone, more of the particles at the edge of the air flow as the air flow passes out of the first cone section 220 may continue within the air flow as the air flow enters the second cone section 222 at end 222A.

The particle concentrator 200 includes an output tube 225, which is configured to receive the air flow being fluidly communicated through the input tube 215 and the cones 220, 222 and 224. The external end 231 of the output tube 225 serves as a sample output port 231. The air flow being fluidly communicated through the output tube 225 flows out the sample output port 231 and onto sample screen 235. The concentrator housing 210 also includes a bypass output port 240, from which a portion of the airflow 255 exits the concentrator housing 210.

In operation, the input air flow 250 is fluidly communicated from the input tube 215 to the sample output port 231 and the bypass output port 240, with one portion 260 of the input air flow 250 being fluidly communicated to the sample output port 231 and another portion 255 being fluidly communicated to the bypass output port 240. As the air flow is fluidly communicated between the first cone section 220 and the second cone section 222, some of the air flow escapes from the centerline air flow through bypass gap 230 and into the internal portion of the concentrator housing 210 and exits the concentrator housing 210 through the bypass output port 240 as part of air flow 255. Similarly, as the air flow is fluidly communicated between the second cone section 222 and the third cone section 224, some of the air flow escapes from the centerline air flow through bypass gap 232, into the internal portion of the concentrator housing 210 and exits the concentrator housing 210 through the bypass output port 240 as part of air flow 255. Also, as the air flow is fluidly communicated between the third cone section 224 and the output tube 225, some of the air flow escapes from the centerline air flow through the bypass gap 234 the internal portion of the concentrator housing 210 and exits the concentrator housing 210 through the bypass output port 240 as part of air flow 255.

Figure 3:
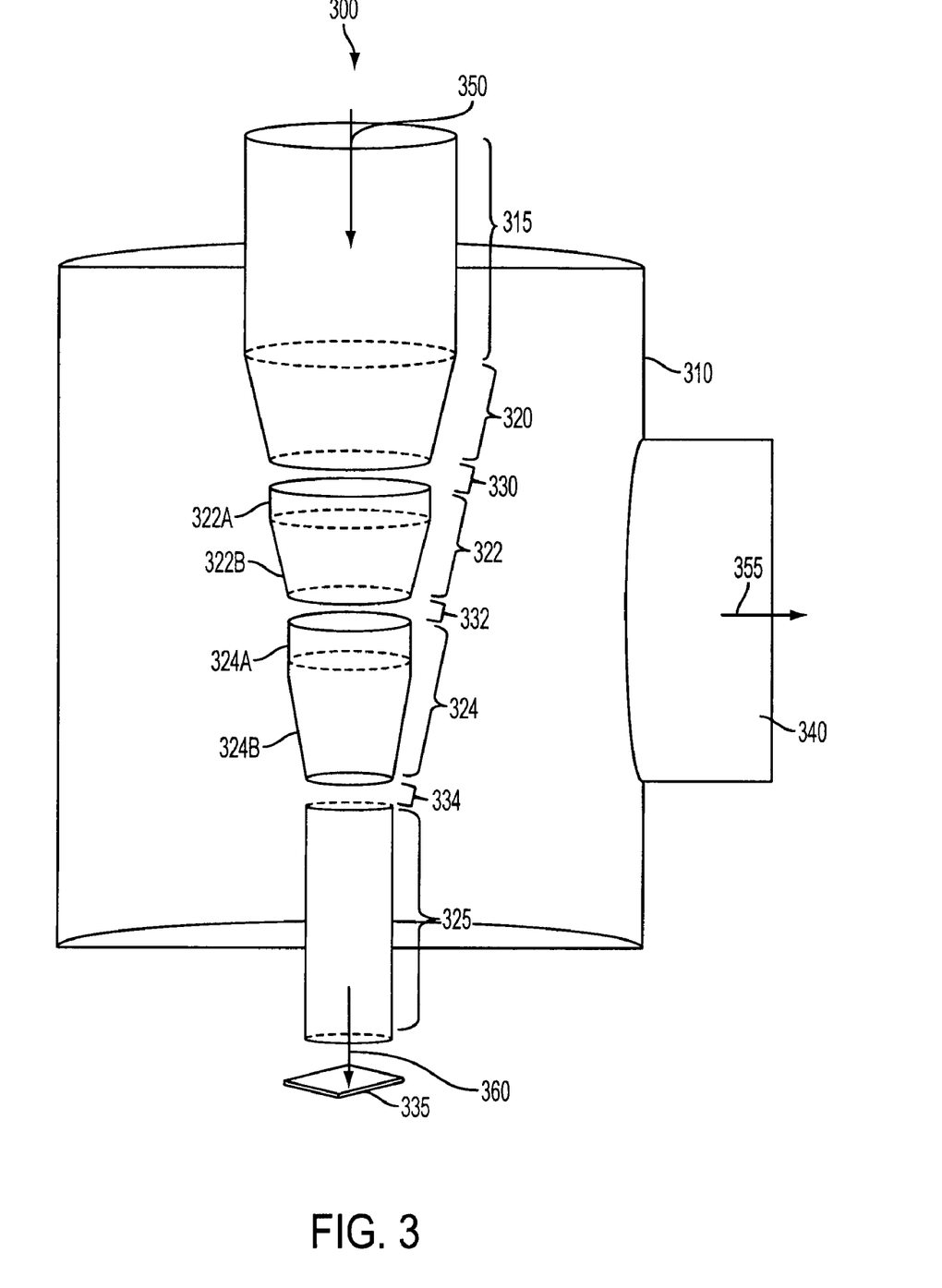

FIG. 3 depicts another example particle concentrator 300 that includes a concentrator housing 310 and an input tube 315, which is configured to receive an air flow and is connected to a first cone section 320. In contrast with the concentrator 200 described previously with respect to FIG. 2, the concentrator 300 includes tube-cone sections 322 and 324. The tube-cone section 322 includes a tube portion 322A that is not tapered and a tapered cone section 322B. Similarly, the tube-cone section 324 includes a tube portion 324A that is not tapered and a tapered cone section 324B.

The tube portion 322A receives an air flow from the first cone section 320, and the air flow is fluidly communicated through tapered cone section 322B. The tube portion 324A receives an air flow from the second cone section 322B, and the air flow is fluidly communicated through tapered cone section 324B. The output tube 325 receives the air flow from the third cone section 324B. Bypass gaps 330, 332 and 334 enable a portion of the air flow 350 being fluidly communicated from the input tube 315 to the output tube 325 to escape from the air flow 350 to form airflow 355 that exits the concentrator housing 310 through the bypass output port 340. A portion 360 of the air flow is fluidly communicated through the output tube 325 and onto a sample screen 335.

Figure 4:
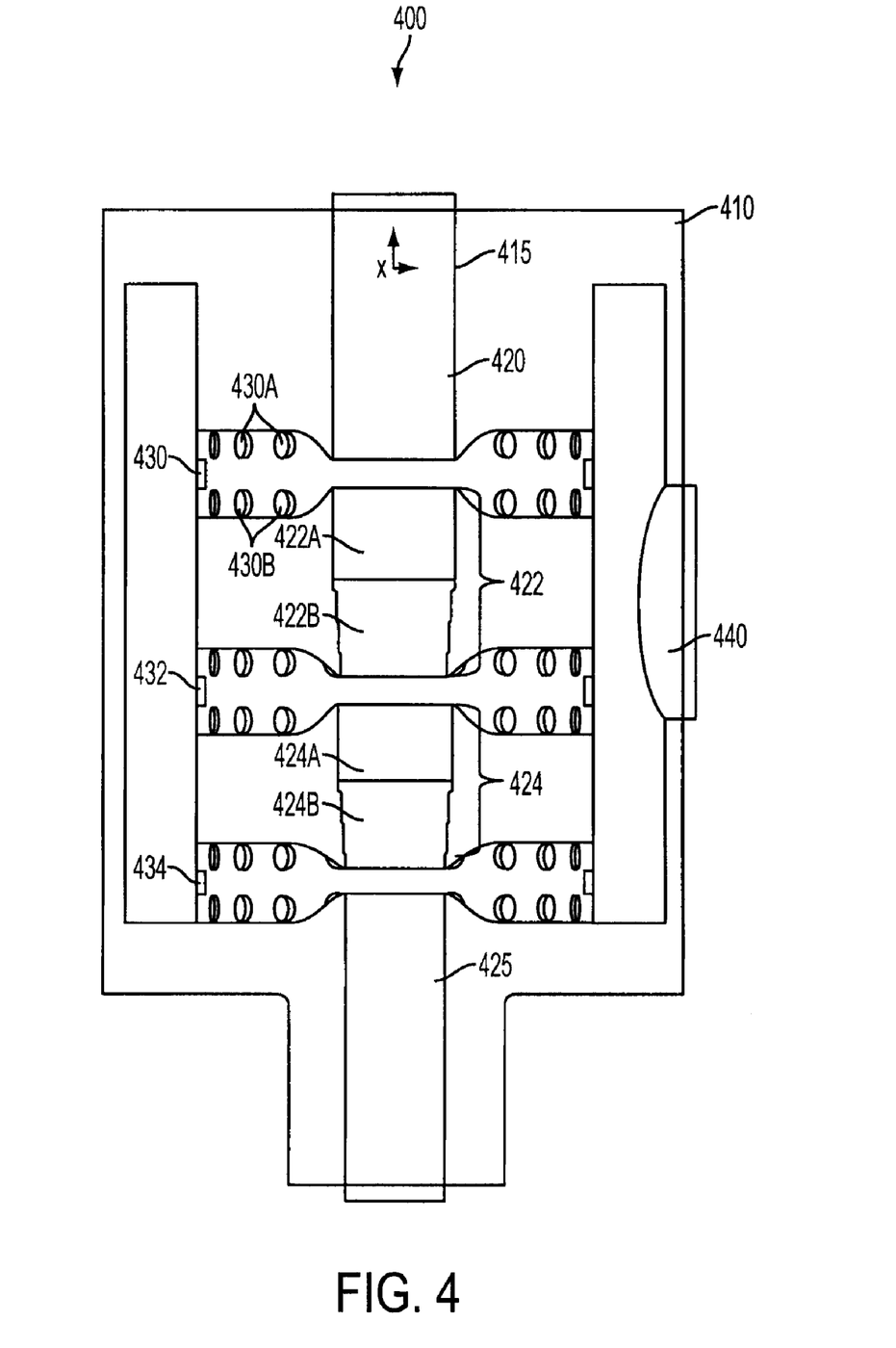

FIG. 4 depicts yet another example particle concentrator 400 that includes a concentrator housing 410 and an input tube 415, which is configured to receive an air flow and is connected to a first cone section 420. The particle concentrator 400 includes tube-cone sections 422 and 424, each having a tube section 422A and 424A, respectively, and a cone section 422B and 424B, respectively. In contrast with the concentrator 300 described previously with respect to FIG. 3, the concentrator 400 includes pump rings 430, 432 and 434. Each pump ring includes two rows of pump holes. For example, pump holes 430A and 430B are included in pump ring 430. The pump rings with pump holes provide gaps to allow air to escape from the air flow being fluidly communicated from the input tube 415 to the output tube 425. A pump ring with pump holes is an example implementation of a bypass gap. The escaped air then exits the housing concentrator 410 through the bypass output port 440.

Figure 5:
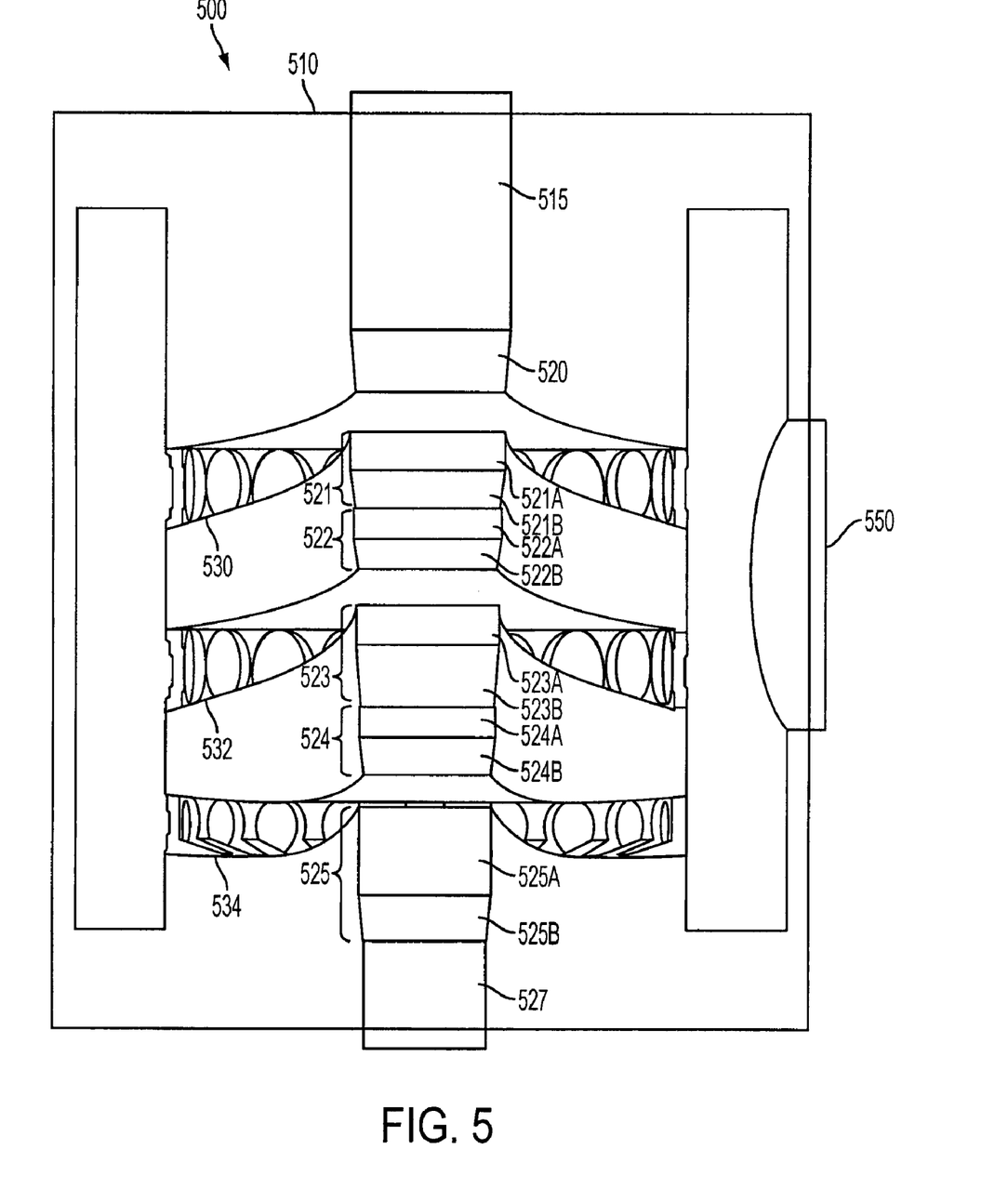
Figure 6:
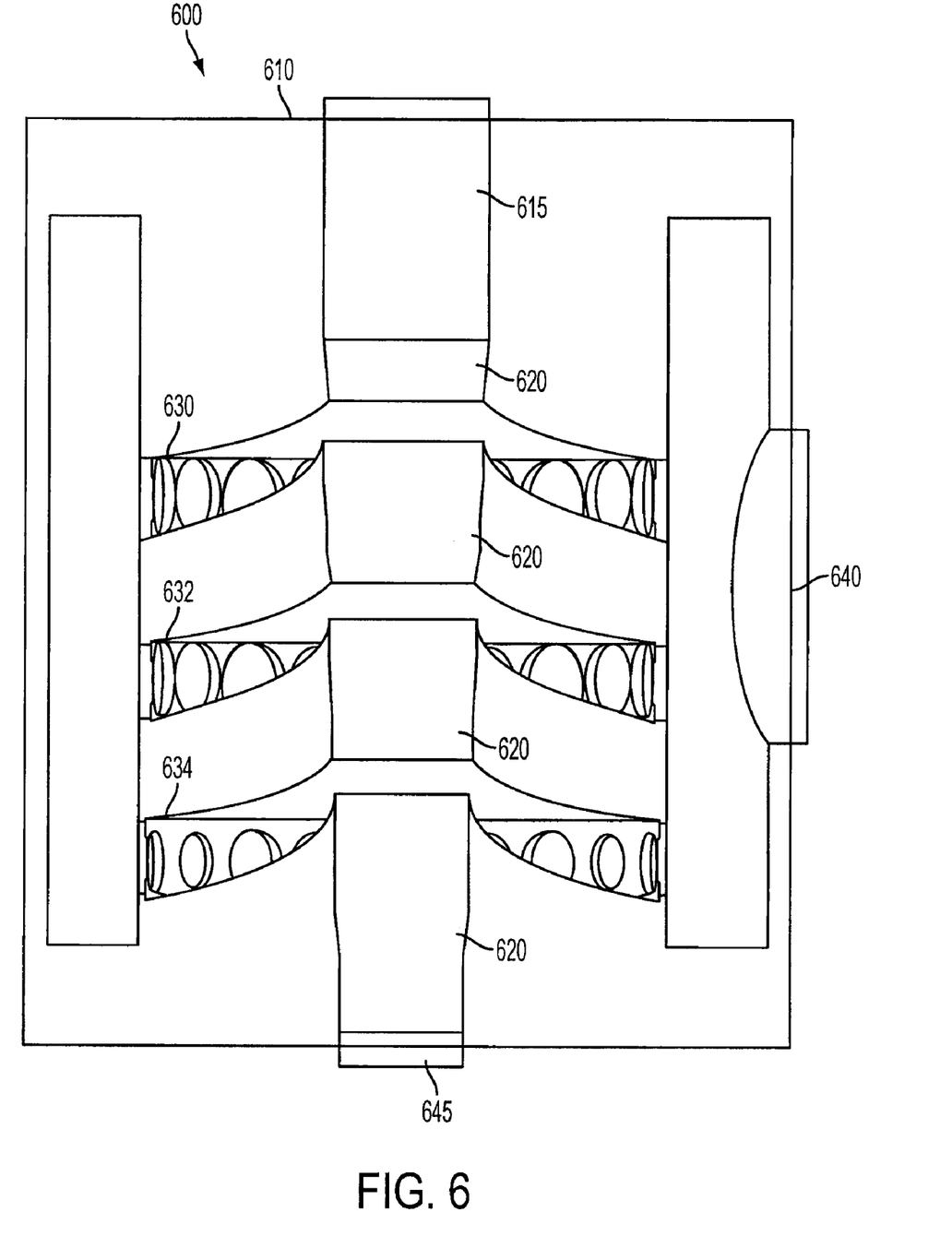
Figure 7:
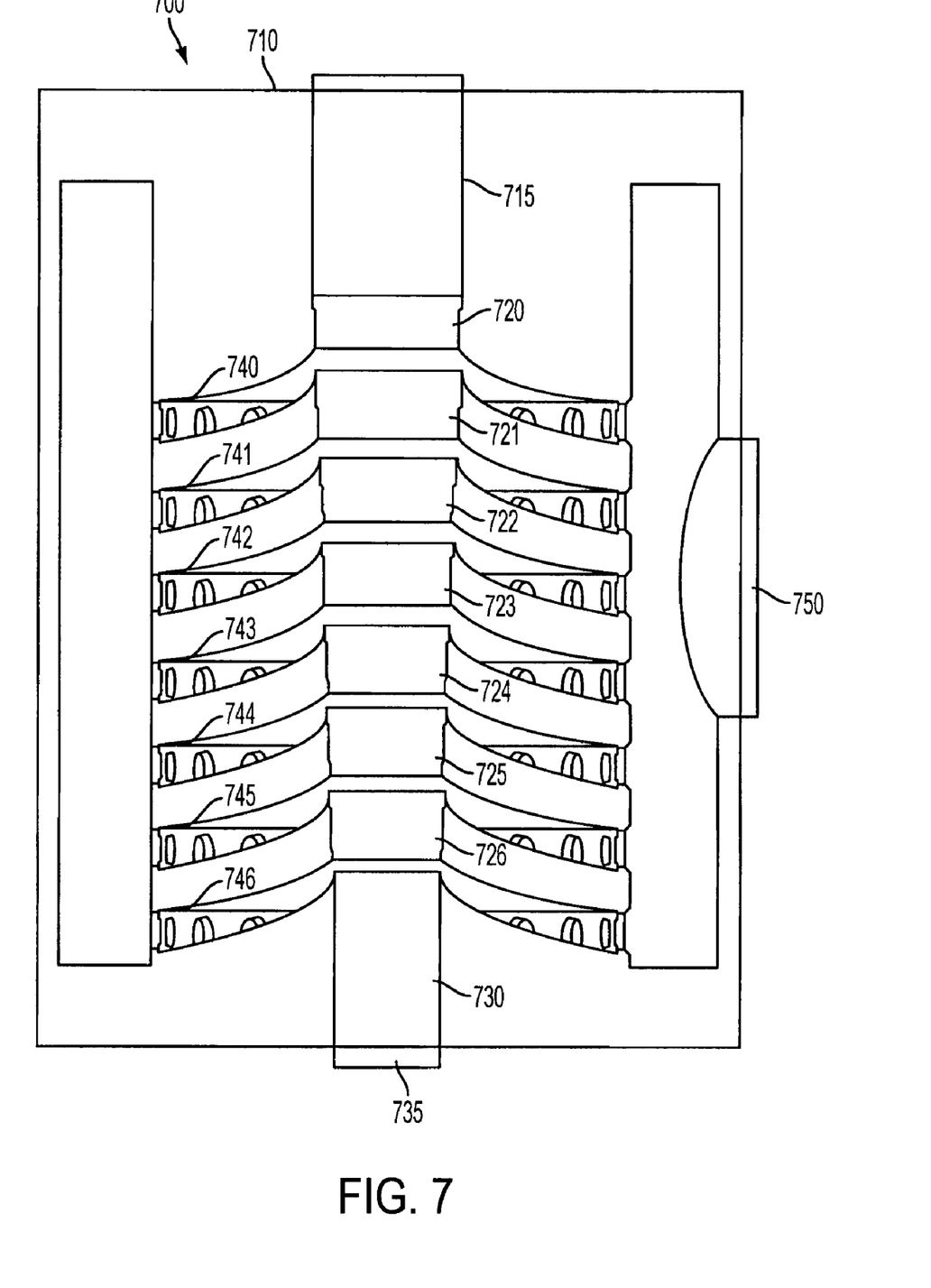

FIG. 5 depicts another example particle concentrator 500 that includes a concentrator housing 510 and an input tube 515, which is configured to receive an air flow, and is connected to a first cone section 520. The particle concentrator 500 includes tube-cone sections 521-525, each having a tube section 521A-525A, respectively, and a cone section 521B-525B, respectively.

Similarly to the concentrator 400 described previously with respect to FIG. 4, the concentrator includes pump rings 530, 532 and 534. In contrast with the concentrator 400, the concentrator 500 includes the pump rings 530, 532 and 534 each include a single row of pump holes. Also, in contrast with the concentrator 400, the concentrator 500 includes two tube-cone sections between each pump ring. In particular, the concentrator 500 includes the tube-cone sections 521 and 522 between the pump rings 530 and 532. The concentrator 500 includes the tube-cone sections 523 and 524 between the pump rings 532 and 534. The concentrator 500 includes the tube-cone section 525 between the pump ring 534 and the output tube 527.

Figure 8A:
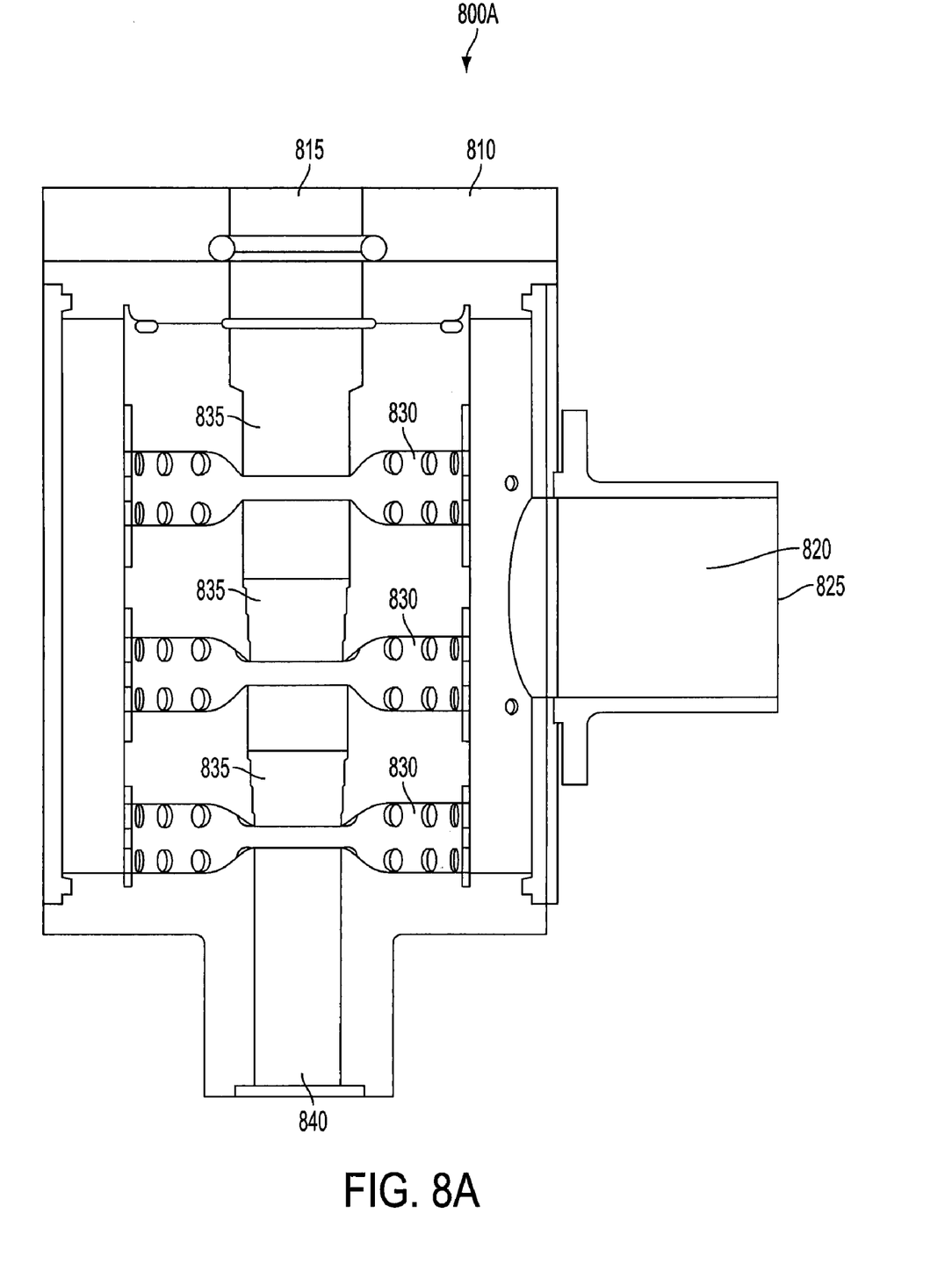

In operation, the structure of the cone section 520 and the tube-cone sections 521-525 help keep the particles in the centerline air flow from the input tube 515 to the output tube 527, while enabling a large volume of air exit through the bypass output port 550. This results in a concentration of particles exiting the sample output port at the end of the output tube, which, in turn, helps improve the accurate identification of substances of interest.

FIG. 6 depicts still another example particle concentrator 600 that includes a concentrator housing 610, an input tube 615, an output tube 620, pump rings 630, 632 and 634, a bypass output port 640 and a sample output port 645. The output tube 620 gradually tapers from its connection to the input tube 615 to its sample output port 645. Unlike the concentrator 500, the concentrator 600 does not include separate cone sections. In operation, pump ring holes in the pump rings 630, 632 and 634 enable a large volume of air to exit through the bypass output port 640, while the tapering structure of the output tube 620 helps keep the particles in the centerline air flow, while minimizing the number of particles that stick to the interior wall of the output tube 620 or escape through the pump ring holes, which results in a concentration of particles exiting the sample output port 645 at the end of the output tube, which, in turn, helps improve the accurate identification of substances of interest.

FIG. 7 depicts another example particle concentrator 700 that includes a concentrator housing 710, an input tube 715, cone sections 720-726, an output tube 730 having a sample output port 735, pump rings 740-746 and a bypass output port 750. The cone sections 720-726 are individually and collectively tapered such that the cone section 720 has a larger average diameter than cone section 721, which has a larger average diameter than cone section 722, and so on. In operation, pump ring holes in the pump rings 740-746 enable a large volume of air to exit through the bypass output port 750, while the tapering structure of the cone sections 720-726 helps keep the particles in the centerline air flow, while minimizing the number of particles that stick to the interior wall of the output tube 730 or escape through the pump ring holes. The air flow exiting sample output port 735 includes a concentration of particles as compared to the concentration of particles in the air flow entering the input tube 715.

FIG. 8A is another example of a particle concentrator 800A. The concentrator 800A includes a concentrator housing 810, an input port 815, bypass tube 820 connected to a bypass output port 825, pump rings 830 with pump holes (which may be referred to as exhaust holes), three concentrator cones 835, and sample output port 840. As illustrated, each of the concentrator cones 835 is preceded by a tube (which may be referred to as a receiving tube) having a straight wall and a slightly larger diameter than the concentrator cone that follows the tube. The larger diameter of the tube relative to the preceding cone helps to capture some of the particles that deviate from the air flow into the concentrator cone that otherwise would escape from the air flow and exit the concentrator housing through the bypass output port 825.

A gap between a cone and the subsequent tube is covered by one of the pumping rings 830, which have pumping holes from which a portion of the air flow that escapes the air flow through the concentrator cones 835 and exits the concentrator housing 810 through the bypass output port 825.

In this implementation, a concentration cone does not compress the air flow generally by more than twenty percent of the entrance area of the concentrator cone. A receiving tube generally does not have an entrance area more than one hundred ten percent of the subsequent concentration cone. The bypass gap between a cone and the subsequent tube generally is not greater than one hundred percent of the concentration cone area (as measured by the distance of the circumference of the cone exit). Pump rings provide a blank off area that blocks line-of-sight flow from the corresponding bypass gap. A pump ring has substantially the same height as the bypass gap. The pump holes provide a two hundred percent area of the concentration cone for ventilation of the bypass gap escaping air to the bypass chamber. The bypass output port is sized based oh the air pump inlet port used to create the air flow from the concentrator housing through the bypass output port. The bypass chamber has a single-sided cross-sectional area substantially equal to at least one hundred percent of the bypass output port area. The sample output port has a vacuum pressure substantially equal to or more than the vacuum pressure of the bypass output port. The sample output port has a substantially straight wall for some portion of the length of the output port, as does the input port. In some implementations, the sample output port further reduces the airflow and generally may do so up to around twenty percent, in general, the example particle concentrator 800A receives an air flow having a velocity between 10 and 60 liters per second. In this example implementation, typical particle losses from the air flow generally are not greater than ten percent.

Figure 8B:
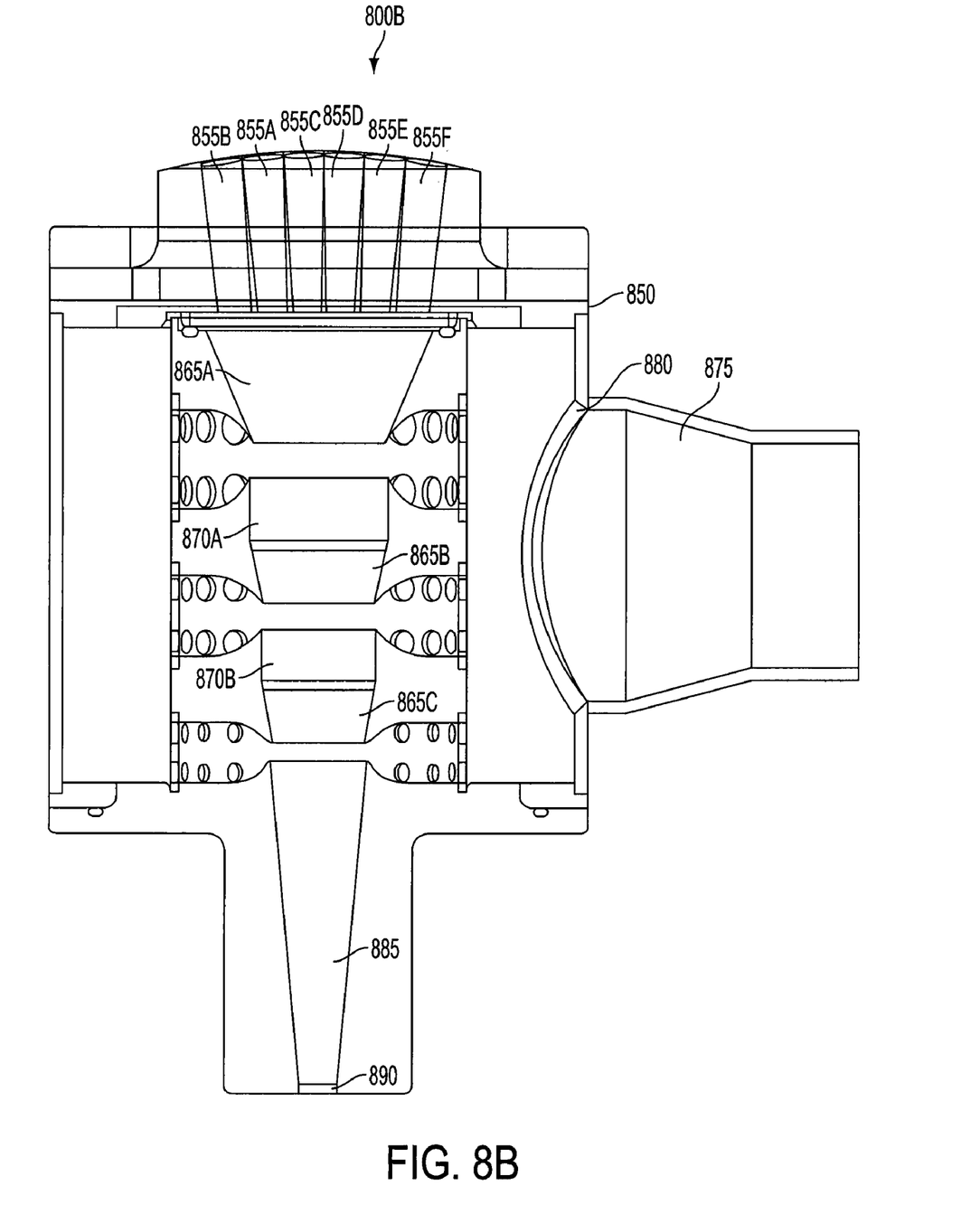

FIG. 8B is another example of a particle concentrator 800B. The concentrator 800B includes a concentrator housing 850, multiple input tubes 855A-855F, concentrator cones 865A-865C, straight-walled tubes 870A and 870B, a bypass tube 875 connected to a bypass output port 880, an output tube 885, and sample output port 890. As illustrated, each of concentrator cones 865B and 865C is preceded by a straight-walled tube 870A and 870B. As illustrated, all input tubes 855A-855F fluidly communicate the gas flow to concentrator cone 865A. Also, as shown in this example, the output tube 885 is cone-shaped such that its inlet is a larger diameter than its outlet. Although the example of particle concentrator 800B includes six input tubes, other implementations of particle concentrators can include more input tubes or fewer input tubes.

Figure 9:
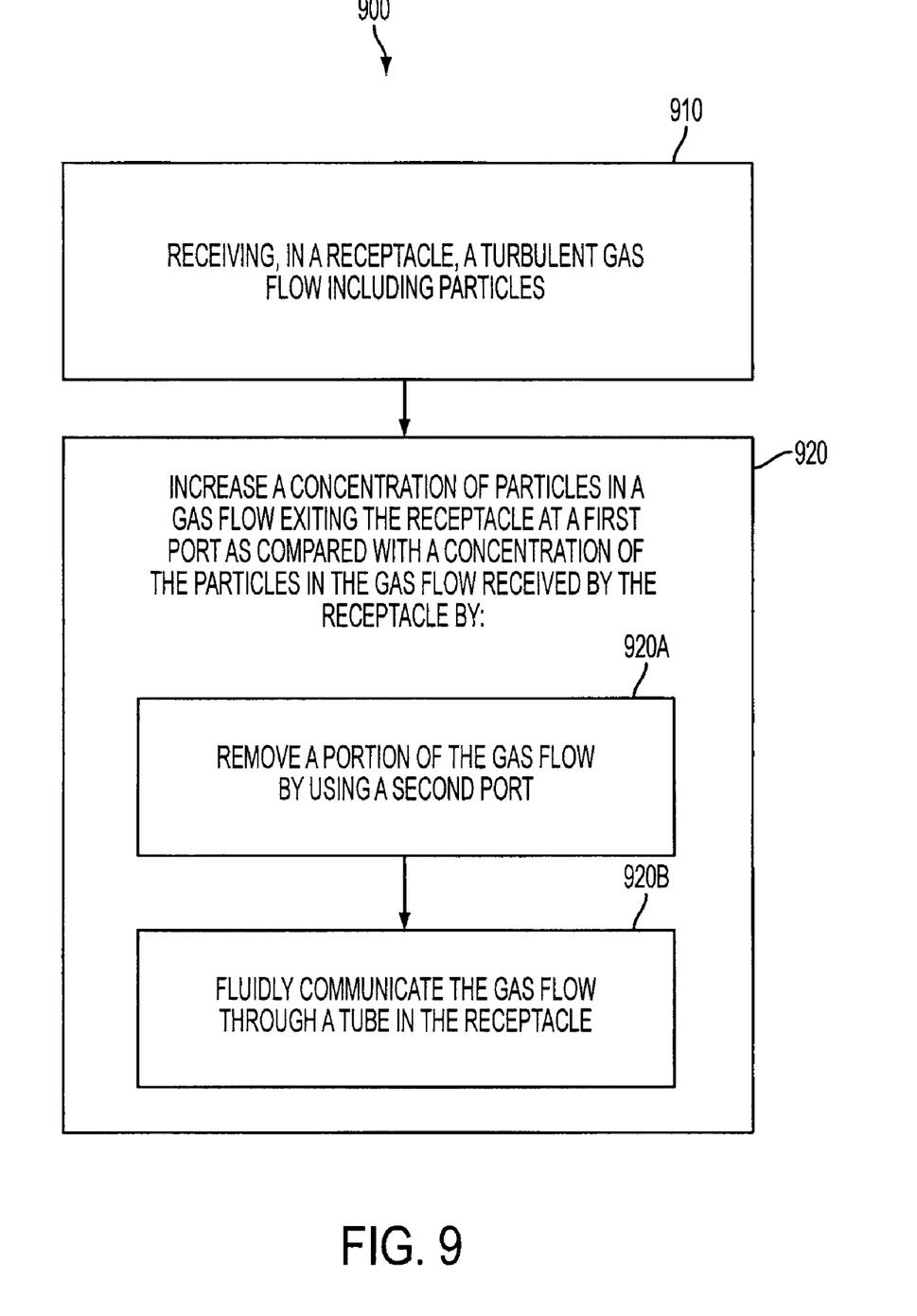
FIG. 9 is a flow chart of a process for concentrating particles.
Figure 10:
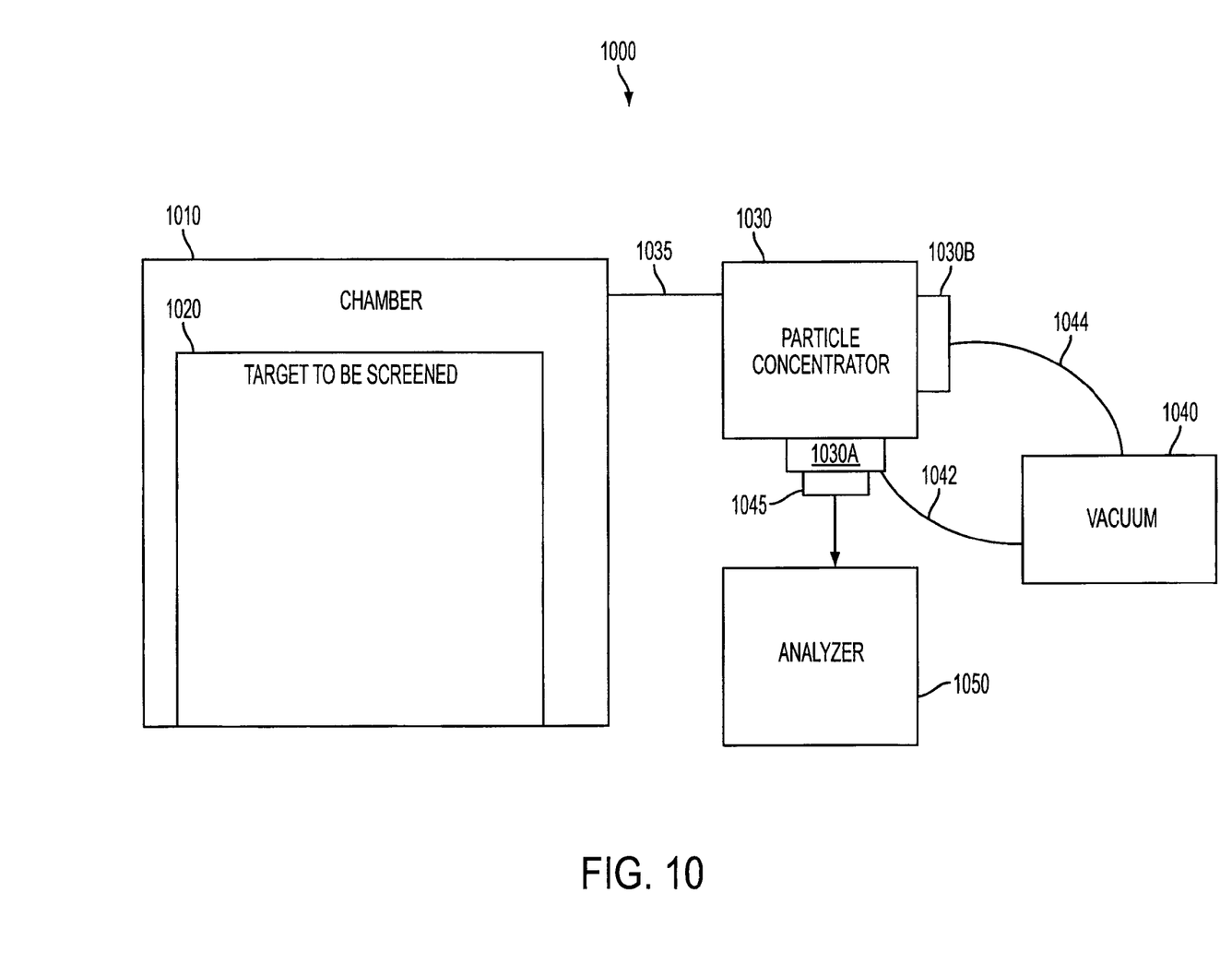
FIG. 10 is a block diagram of an explosive detection system including a particle concentrator.
Like reference symbols in the various drawings indicate like elements.

FIG. 9 shows a process 900 for concentrating particles in a turbulent gas flow. The process 900 may be performed, for example, by one of the particle concentrators 100-800 described previously with respect to FIGS. 1-8.

The process includes receiving, in a receptacle, a turbulent gas flow including particles (step 910). The process also includes increasing a concentration of particles in a gas flow exiting the receptacle at a first port as compared with a concentration of the particles in the gas flow received by the receptacle (step 920). To do so, the process includes removing a portion of the gas flow by using a second port (step 920A) and fluidly communicating the gas flow through a tube in the receptacle (step 920B). The tube has a smaller diameter at the end of the tube at which the gas flow exits the tube than diameter at the end of the tube at which the gas flow is received.

FIG. 10 is a block diagram of an explosive detection system 1000 including a chamber 1010 containing a target 1020 to be screened for explosive particles. The target 1020 may be, for example, a cargo container, luggage or a parcel. The system 1000 also includes a particle concentrator 1030, which may be, for example, an implementation of one of the concentrators 100-800 described previously described with respect to FIGS. 1-8. A connector tube 1035 connects the chamber 1010 to the particle concentrator 1030. A vacuum pump 1040 is connected, through a connector tube 1042, to a sample output port 1030A of the particle concentrator 1030 and is connected, through a connector tube 1044, to a bypass output port 1030B of the particle concentrator 1030. The vacuum pump is configured to exert higher pressure at the sample output port 1030A than the bypass output port 1030B. The gas flow that enters the particle concentrator 1030 from the chamber 1010 has a lower concentration of particles than the gas flow exiting the particle concentrator 1030 at the sample output port 1030A. A particle collector 1045 is connected to sample output port 1030A and is configured to collect particles from the gas flow exiting the particle concentrator at the sample output port 1030A. An analyzer 1050 processes the particle collector 1045 to determine whether particles in the particle collector 1045 includes any explosive particles.

The techniques and concepts have been generally described with respect to an air flow and a single input. Other types of non-condensable gas flows may be used, such as natural gas, propane gas or a Freon carrier. Some implementations may not include a filter or another type of particle collector material. For example, an air flow that has been concentrated may be provided to another device or system for use or analysis.

Although the techniques and concepts have been generally described with respect to detecting explosive particles, the techniques and concepts can be applied in other contexts, such as detecting contaminants or prohibited items.

It will be understood that various modifications may be made without departing from the spirit and scope of the claims. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. An apparatus for collecting particles from a gas flow comprising:
- a receptacle including:
  - a cone section comprising a first inlet and a first outlet, wherein:
    - the cone section is configured to receive a non-condensable, turbulent gas flow, the gas flow including particles of matter,
    - a diameter of the first inlet of the cone section is greater than diameter of the first outlet of the cone section;
    - the cone section is configured to fluidly communicate gas from the first inlet to the first outlet; and
- an outlet tube comprising a second inlet and a second outlet and being separated from the cone section by a gap, the gap enabling a first portion of the gas flow to exit the receptacle through a bypass output port, and the gap being between the first outlet of the cone section and the second inlet of the outlet tube, such that the first outlet opens to the gap and the gap separates the cone section and the outlet tube along a direction of gas flow.

2. The apparatus of claim 1 wherein the gas flow is a gas flow of at least two liters per second.

3. The apparatus of claim 1, wherein the cone section is a first cone section, further comprising:
- a second cone section comprising a third inlet and a third outlet, wherein:
  - the first cone section is configured to receive the gas flow only after the gas flow has passed through the second cone section,
  - a diameter of the third inlet of the second cone section is greater than diameter of the third outlet of the cone section,
  - the second cone section is configured to fluidly communicate gas from the second inlet to the first second outlet, the second cone section being separate from the first cone section by a second gap, the second gap enabling a second portion of the gas flow to exit the receptacle through the bypass output port, and the second gap being between the third outlet of the second cone section and the first inlet of the first cone section, such that the third outlet of the second cone section opens to the second gap and the second gap separates the first cone section and the second cone section along a direction of gas flow; and a sample output port configured to receive a third portion of the gas flow only after the gas flow has passed through the outlet tube.

4. The apparatus of claim 3 further comprising an input tube connected to the second cone section and configured to receive the gas flow before the gas flow is received by the second cone section.

5. The apparatus of claim 4 further comprising a straight tube having substantially the same diameter at each end of the tube, the straight tube connected to the first cone section and configured to receive the gas flow only after the gas flow has passed through the second cone section and before the gas flow is received by the first cone section.

6. The apparatus of claim 3 wherein the apparatus further comprises a particle collector configured to receive the gas flow only after the gas flow has passed through the outlet tube and to hold particles from the gas flow.

7. The apparatus of claim 6 wherein the particle collector is a low-porosity mesh or fiber.

8. The apparatus of claim 4 further comprising one or more gas flow sources join fluid communication with the sample output port and the bypass output port such that the gas flow is forced from the input tube to the sample output port and the bypass output port.

9. The apparatus of claim 3 wherein vacuum pressure of the second and third portions of the gas flow at the bypass output port is equal to or greater than vacuum pressure of the third portion of the gas flow at the sample output port.

10. The apparatus of claim 3 wherein volume of the first portion of the gas flow and the second portion of the gas flow at the bypass output port is greater than volume of the third portion of the gas flow at the sample output port.

11. The apparatus of claim 3 wherein the second portion of the gas flow at the bypass output port includes fewer particles of matter than the third portion of the gas flow at the sample output port.

12. The apparatus of claim 3 wherein the third portion of the gas flow at the sample output port includes more particles of matter per unit of flow than the gas flow received by the second cone section.

13. The apparatus of claim 1 wherein the gap comprises a ring, the ring comprising a ring wall defining a plurality of holes enabling the first portion of the gas flow to flow into the receptacle and to exit the receptacle through the bypass output port.

14. The apparatus of claim 13 wherein the plurality of holes are arranged in one or more rows of holes.

15. The apparatus of claim 1 wherein the gas flow comprises one or more of air, natural gas, propane, or a Freon gas.

16. The apparatus of claim 1 wherein the receptacle includes multiple input tubes, an input tube being configured to receive gas.

17. The apparatus of claim 1 further comprising a ring that substantially surrounds the gap.

18. The apparatus of claim 17 wherein the ring comprises multiple holes.

19. The apparatus of claim 17 wherein the ring is configured to receive the first outlet of the cone section and the second outlet of the outlet tube.

20. The apparatus of claim 1 wherein the diameter of the second inlet of the output tube is larger than the first outlet of the cone section.

21. The apparatus of claim 1 wherein the receptacle includes three or more cone sections, each of the cone sections comprising an inlet and an outlet, a diameter of the inlet being greater than a diameter of the outlet, and wherein the three or more cone sections are arranged in a sequence such that any two of the cone sections are separated by a respective gap, each respective gap enabling a respective portion of the gas flow to exit the receptacle through the bypass output port, and each respective gap being between an outlet of one cone section and an inlet of a subsequent cone section in the sequence, such that the outlet of the one cone section opens to the respective gap and the respective gap separates the one cone section and the subsequent cone section along a direction of gas flow.

22. The apparatus of claim 1, wherein the gap enables the first portion of the gas flow to flow into the receptacle and to exit the receptacle through the bypass output port.

23. The apparatus of claim 3 wherein the diameter of the first inlet of the first cone section is larger than the third outlet of the second cone section.

24. The apparatus of claim 3 wherein the first and second cone sections are of similar shape.

25. The apparatus of claim 4 further comprising one or more gas flow sources connected to the input tube, the gas flow sources providing the gas flow.

26. The apparatus of claim 8 wherein the gas flow provided by the gas flow sources is substantially equal to a sum of the first, second, and third portions of the gas flow.

27. A detection system comprising:
a space configured to receive a target to be screened;
a particle concentrator comprising:
a cone section comprising a first inlet and a first outlet, wherein:
the cone section is configured to receive a non-condensable, turbulent gas flow from the space, the gas flow including particles of matter,
a diameter of the first inlet of the cone section is greater than diameter of the first outlet of the cone section;
the cone section is configured to fluidly communicate gas from the first inlet to the first outlet; and
an outlet tube comprising a second inlet and a second outlet and being separated from the cone section by a gap, the gap enabling a first portion of the gas flow to exit the particle concentrator through a bypass output port, and the gap being between the first outlet of the cone section and the second inlet of the outlet tube, such that the first outlet opens to the gap and the gap separates the cone section and the outlet tube along a direction of gas flow; and
a particle collector configured to receive gas from the second outlet.

28. The detection system of claim 27 wherein the target comprises luggage.

29. The detection system of claim 27 wherein the target comprises a person or an object in contact with a person.

30. The detection system of claim 27 further comprising an analyzer configured to determine whether a particle collected on the particle collector comprises an energetic material.

* * * * *

UNITED STATES PATENT AND TRADEMARK OFFICE
CERTIFICATE OF CORRECTION

PATENT NO. : 8,137,446 B2
APPLICATION NO. : 12/047052
DATED : March 20, 2012
INVENTOR(S) : Thomas D. Plamondon et al.

It is certified that error appears in the above-identified patent and that said Letters Patent is hereby corrected as shown below:

In column 1, line 7, delete "nd" and insert -- and --, therefor.

In column 10, line 66, in claim 3, delete "the first" and insert -- the --, therefor.

In column 11, line 31, in claim 8, delete "join" and insert -- in --, therefor.

Signed and Sealed this
Twelfth Day of June, 2012

David J. Kappos
*Director of the United States Patent and Trademark Office*